(12) United States Patent
Ruch et al.

(10) Patent No.: US 11,213,938 B2
(45) Date of Patent: Jan. 4, 2022

(54) PRESSING TOOL

(71) Applicant: Von ARX AG, Sissach (CH)

(72) Inventors: Matthias Ruch, Efringen-Kirchen (DE); Rudolf Kreuzer, Buchs (CH)

(73) Assignee: Von ARX AG, Sissach (CH)

( * ) Notice: Subject to any disclaimer, the term of this patent is extended or adjusted under 35 U.S.C. 154(b) by 172 days.

(21) Appl. No.: 16/677,015

(22) Filed: Nov. 7, 2019

(65) Prior Publication Data

US 2020/0139525 A1  May 7, 2020

(30) Foreign Application Priority Data

Nov. 7, 2018 (EP) .................................... 18204899

(51) Int. Cl.
| | |
|---|---|
| *F04B 7/00* | (2006.01) |
| *F01L 1/18* | (2006.01) |
| *B25B 27/02* | (2006.01) |
| *B21D 39/04* | (2006.01) |

(Continued)

(52) U.S. Cl.
CPC .......... *B25B 27/026* (2013.01); *B21D 39/048* (2013.01); *B25B 28/00* (2013.01); *F01L 1/185* (2013.01); *F04B 7/0057* (2013.01); *F04B 7/0065* (2013.01); *F04B 7/0069* (2013.01); *F16D 41/064* (2013.01); *F15B 2211/275* (2013.01); *F15B 2211/50518* (2013.01); *F15B 2211/633* (2013.01); *F15B 2211/6309* (2013.01); *F15B 2211/6323* (2013.01); *F15B 2211/6651* (2013.01); *F15B 2211/76* (2013.01); *F15B 2211/7716* (2013.01)

(58) Field of Classification Search
CPC . F01L 2001/0473; F01L 1/185; F04B 7/0057; F04B 7/0065; F04B 7/0069; F15B 15/18
See application file for complete search history.

(56) References Cited

U.S. PATENT DOCUMENTS

| | | | | |
|---|---|---|---|---|
| 5,209,153 | A | * | 5/1993 | Araki ..................... B25B 7/126 269/238 |
| 5,272,811 | A | * | 12/1993 | Armand ................. A62B 3/005 30/228 |

(Continued)

FOREIGN PATENT DOCUMENTS

| | | |
|---|---|---|
| DE | 202006001889 U1 | 3/2007 |
| DE | 102008027886 A1 * 12/2009 | ............. F01L 1/462 |
| EP | 2501523 B1 | 4/2015 |

OTHER PUBLICATIONS

European Search Report dated Apr. 29, 2019; Application No. EP 18204899.1; 7 pages.

*Primary Examiner* — Kenneth Bomberg
*Assistant Examiner* — Matthew Wiblin
(74) *Attorney, Agent, or Firm* — Mark E. Bandy; Rankin Hill & Clark, LLP

(57) ABSTRACT

A pressing tool is described for plastically deforming a workpiece. The pressing tool comprises a piston pump driven by a motor that rotates in operating rotation direction RA and a pressure release valve and a coupling arrangement, which mechanically couples the motor to the pressure relief valve, so that the motor opens the pressure relief valve when operated in a loosening rotation direction RL opposite to the operating rotation direction RA. Also described is a corresponding method of operating a pressing tool.

17 Claims, 2 Drawing Sheets

(51) Int. Cl.
*B25B 28/00* (2006.01)
*F16D 41/064* (2006.01)

(56) References Cited

U.S. PATENT DOCUMENTS 6,276,186 B1 * 8/2001 Frenken ................ B21D 39/04
                                                  29/751
2016/0252112 A1 * 9/2016 Kehoe .................... B23D 29/00
                                                  60/327

* cited by examiner

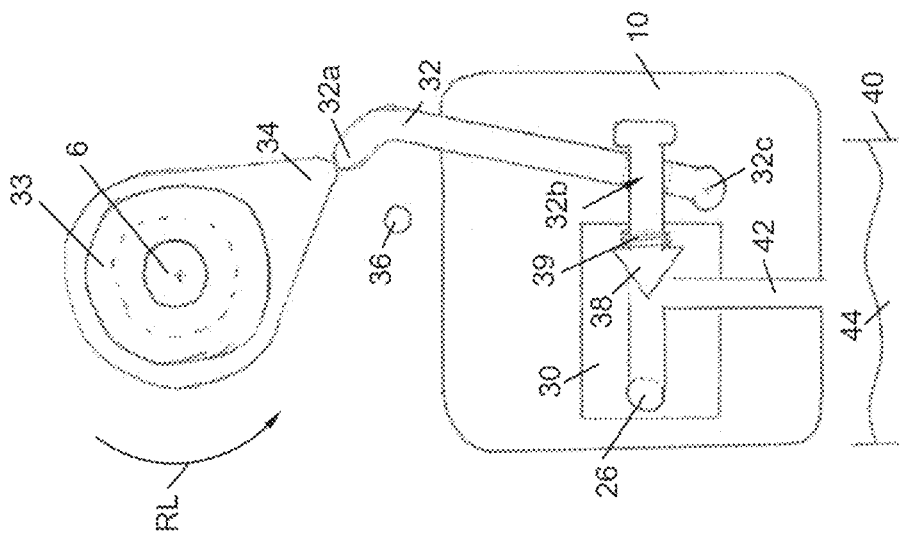
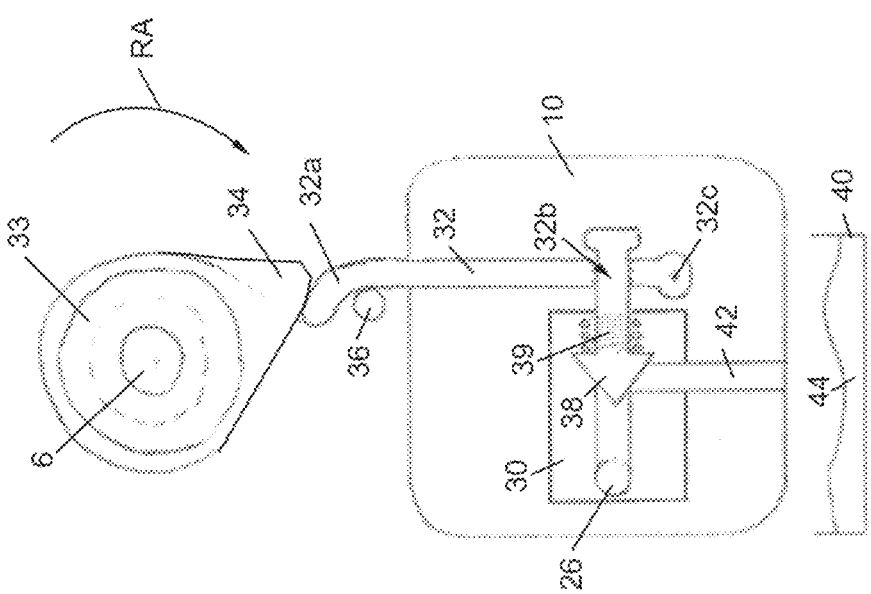

PRESSING TOOL

FIELD

The present invention relates to a pressing tool, particularly a hand-held pressing tool, for plastically deforming workpieces and preferably tubular workpieces. The invention further relates to a method of operating a hand-held pressing tool. In particular, the pressing tool in accordance with the invention is suitable for joining tubes together by pressing compression fittings in the field of heating and sanitary installation.

BACKGROUND

Several methods of joining tubular workpieces are known in the prior art. One of these methods puts a larger pipe over a smaller pipe and presses the two pipes against each other. In a different method, pipes are joined together by pressing compression fittings. A potential device for a simple pressing process is a hand-held pressing tool, particularly a pipe pressing tool. Such hand-held pressing tools have a pressing instrument with interchangeable jaws, for example jaws for pressing, crimping, or cutting workpieces. In pipe pressing tools for joining pipes together by means of a compression fitting, the pressing jaws surround the compression fitting arranged around the pipe. By closing the pressing jaws, the compression fitting and the pipe are plastically deformed and, thus, permanently joined together.

Usually, a hand-held pressing tool is operated by means of a DC electric motor. For electricity supply, the pressing tool may be connected to an electricity grid or an accumulator. For the purpose of generating the required high pressing forces, an electro-hydraulic or electromechanical converter is usually arranged between the electric motor and the pressing instrument. The electric motor generates a rotary motion which is geared-down by a transmission connected to the electric motor. The drive shaft of the transmission, in turn, drives an eccentric of an eccentric shaft. In a hydraulic converter, a piston of a piston pump is moved backwards and forwards by the driven eccentric and, thus, a hydraulic fluid is guided to a cylinder space. By means of the hydraulic fluid conveyed by the piston pump, pressure is applied to a servo piston within the cylinder space and the servo piston is moved linearly in the direction of the pressing instrument. Rollers connected to the servo piston then actuate the pressing instrument that, preferably, is interchangeable, for example pressing jaws, and lead to the pressing jaws being closed. When the pressing jaws are being closed, the pressing jaws transmit a force to the workpieces to be pressed and press and/or join them together.

For example, from document EP 2 501 523 B1, a hand-held pressing tool for pressing a compression fitting in installation engineering and for pressing cable lugs is known. For the purpose of generating the required high pressing forces, the pressing instrument is connected to an electro-hydraulic converter. A brushless electric motor is used as a drive motor. As soon as the required pressing force is reached, a purely mechanical relief valve opens and the motor speed surges. This is recognized by a control of the pressing tool, and the electric motor is subsequently switched off.

Previously, the pressing tools have always applied force up to a maximum pressing force of the pressing tools to workpieces. However, individual workpieces are already completely compressed against each other at a lower pressing pressure because of their material or shape properties. In such a case, the hydraulic pressure in the cylinder space quickly rises in case of further pressing because the workpiece is not plastically deformed, but the tool is elastically deformed. In this process, the elastic deformation does not cause any further compression of the workpiece, but leads to intense wear of the pressing jaws and of the pressing instrument. Additionally, electric power is unnecessarily consumed and the pressing process takes unnecessarily long.

Hence, the problem underlying the invention is to provide a hand-held pressing tool which operates in a manner that is optimized for different pressing processes and in which wear of the pressing instruments is considerably reduced.

SUMMARY

The difficulties and drawbacks associated with previous approaches are addressed in the present subject matter as follows.

In one aspect, the present subject matter provides a pressing tool for plastically deforming a workpiece. The pressing tool comprises an electric motor and pressing jaws for applying a pressing force to a workpiece. The pressing tool also comprises a hydraulic force transmitting unit for transmitting the force of the electric motor to the pressing jaws. The hydraulic force transmitting unit comprises a piston pump driven by the electric motor rotating in operating rotation direction RA, and a pressure relief valve. The pressing tool also comprises a coupling arrangement which mechanically couples the electric motor to the pressure relief valve, so that the electric motor opens the pressure relief valve when operated in a loosening rotation direction RL opposite to the operating rotation direction RA.

In another aspect, the present subject matter provides a method of operating a pressing tool. The method comprises operating a hydraulic force transmitting unit by an electric motor rotating in an operating rotation direction RA. The method also comprises detecting the end of the pressing process by a control of the pressing tool. The method additionally comprises reversing the rotation direction of the electric motor from the operating rotation direction RA to the loosening rotation direction RL after the detection of the end of the pressing process. And, the method comprises opening a pressure relief valve of the hydraulic force transmitting unit by the electric motor rotating in loosening rotation direction RL.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

Below, preferred embodiments of the present invention are represented with reference to the enclosed figures.

FIG. 2a shows a schematic side view of parts of the drive portion according to FIG. 1 with a pressure relief valve and its control in the closed state.

FIG. 2b shows a side view according to FIG. 2a with a pressure relief valve and its control in the opened state.

DETAILED DESCRIPTION OF THE EMBODIMENTS

Figure 1:
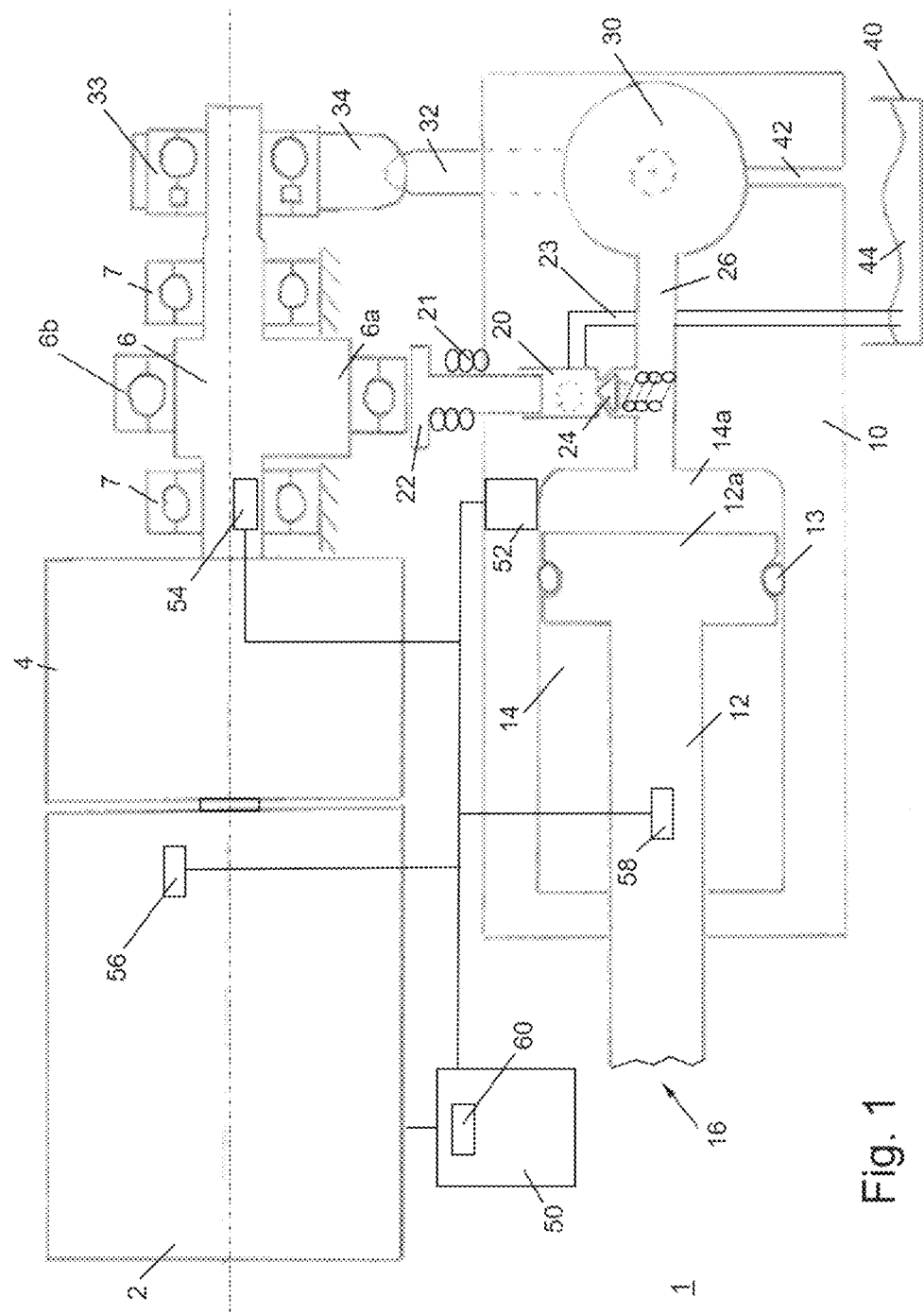
FIG. 1 shows a schematic sectional view of the drive portion of an embodiment of a pressing tool.

In particular, the aforementioned problems are solved by a pressing tool for plastically deforming a workpiece, comprising an electric motor, pressing jaws for applying pressing force to a workpiece, a hydraulic force transmitting unit for transmitting the force of the electric motor to the pressing jaws, comprising a piston pump driven by the electric motor rotating in the operating rotation direction and a pressure relief valve and a coupling arrangement which mechanically couples the electric motor to the pressure relief valve, so that the electric motor opens the pressure relief valve when operated in a loosening rotation direction opposite to the operating rotation direction.

The coupling arrangement has the advantage that the pressing tool performs a pressing process as usual when the electric motor rotates in the operating rotation direction, while the pressure relief valve is opened when the electric motor rotates in the loosening rotation direction. In this manner, the pressure relief valve may be opened in a program-controlled manner at any time by a simple reversal of the rotation of the electric motor. Hence, the electric motor also is the servomechanism for the pressure relief valve.

Opening the pressure relief valve causes the pressing pressure to end, so that the time of the end of the pressing process may consequently be determined by a control, particularly independently of reaching a maximum pressing force. As opposed to prior art, an unnecessary application of a maximum pressing force is prevented with the pressing tool according to the invention. In this way, no, or only a minimum of, elastic deformation occurs at the pressing jaws, which prevents unnecessary wear of the pressing tool, particularly the pressing jaws.

Moreover, the pressing duration is shortened, which makes faster operation possible overall. Usually, maximum pressing pressure is set quite high in order to ensure safe pressing, i.e. joining of the workpieces. If only a lower pressing pressure is needed, with safe pressing still being ensured, the necessary pressing duration also decreases, which makes working with the pressing tool more efficient.

By an inversion of the rotation of the electric motor from the operating rotation direction into the opposite loosening rotation direction and the opening of the pressure relief valve that is associated with it, an additional valve such as a high-pressure hydraulic magnetic valve is not necessary. Thereby, the construction of the pressing tool becomes simpler and more cost-efficient, and its weight decreases.

Preferably, the pressing tool comprises a coupling which only operates in the loosening rotation direction of the electric motor. In this way, the electric motor may operate as usual in its operating rotation direction in order to perform the pressing process. This means that no structural modifications of the pressing tool are necessary for the pressing process. This makes the construction and manufacturing of the pipe pressing tool simpler. In the loosening rotation direction, the coupling makes transmitting force from the electric motor to the pressure relief valve possible in order to open the latter in a motor-driven and program-controlled manner.

Preferably, the coupling comprises a freewheel and, preferably, is a freewheel ball bearing. In this manner, a coupling which only operates in one rotation direction, the loosening rotation direction in this case, may easily be constructed in a reliable manner.

Preferably, the pressing tool further comprises a cam driven by the electric motor via a coupling which may open the pressure relief valve. By means of a cam, the rotary motion of the electric motor may simply be transformed into a preferably linear motion for opening the pressure relief valve.

Preferably, the pressing tool further comprises a lever of the pressure relief valve upon which the cam may act. By means of a lever, the motion of the cam may be transmitted to the pressure relief valve in a manner that is simple in terms of construction. Here, a particularly space-saving control of the pressure relief valve is provided. Additionally, the force of the cam for opening the pressure relief valve may be amplified.

Preferably, the pressing tool further comprises an eccentric shaft with an eccentric driven by the electric motor for actuating the piston pump. The piston pump may be operated by means of the eccentric shaft in a particularly reliable manner. Preferably, a ball bearing is arranged around the eccentric, so that the piston pump is driven with very little friction.

Preferably, the cam is mounted on the eccentric shaft via the coupling and may be driven by it in the loosening rotation direction. In this way, a solution that is simple in terms of construction for driving the cam on the one hand and for driving the piston pump on the other hand is provided.

Preferably, the pressing tool comprises a control for controlling the electric motor and comprises at least one sensor for measuring at least one pressing parameter, wherein the control is adapted to recognize the end of the pressing process based on the at least one pressing parameter and to drive the electric motor in the loosening rotation direction opposite to the operating rotation direction in order to open the pressure relief valve. The use of the control which detects at least one pressing parameter by means of at least one sensor provides the advantage that the pressing tool does not have to apply the maximum pressing force for pressing, but the pressing process may already be ended earlier by the control at a precisely defined state and safe pressing is still guaranteed. This counteracts early wear of the pressing jaws and component groups in the pressing tool. Due to the analysis of the sensor values by the control, the end of the pressing process is recognized, whereupon the electric motor is controlled by the control in the loosening rotation direction opposed to the operating rotation direction in order to open the pressing jaws again and the hydraulic fluid may run into the oil receptacle from the servo piston, so that the pressing tool returns into its opened initial position.

Preferably, the control recognizes the end of the pressing process when switch-off criteria are met, wherein the control then reverses the rotation direction of the electric motor from the operating rotation direction to the loosening rotation direction. The recognition of switch-off criteria which either were input into the system prior to the pressing process or switch-off criteria which are recognized by the sensors briefly before the pressing process makes possible an optimal pressing without having to apply the maximum pressing force that is possible. In particular, based on certain switch-off criteria, it may be recognized that only elastic deformation of the pressing jaws takes place when the pressing process is still continued. Ending the pressing process before the maximum pressing force is unnecessarily applied counteracts early wear of the pressing jaws and other components of the pressing tool. For example, a different switch-of criterion may be reaching an adjustable hydraulic pressure, for example a hydraulic pressure of 400 bar.

Preferably, the at least one sensor comprises a hall effect sensor which captures the rotations of the electric motor and/or a current sensor which captures the supply current of the electric motor and/or a pressure sensor which captures the hydraulic oil pressure and/or a load cell which captures a mechanical force characteristic of the pressing force and/or a torque sensor which captures a torque in the force transmitting unit. More particularly, the at least one sensor is selected from a sensor which captures the revolutions of the electric motor, a current sensor which captures the supply current of the electric motor, a pressure sensor which captures the hydraulic oil pressure, a force sensor which captures a mechanical force characteristic of the pressing force, a torque sensor which captures a torque in the force transmitting unit, and combinations thereof. The at least one sensor enables the control system of the pressing tool to capture different pressing parameters and/or their time curve. These pressing parameters are analyzed by a control system and/or a control in order to determine the reaching of switch-off criteria. The switch-off criteria may be different pressing parameters such as a minimum value, a minimum duration or the like. Based on the switch-off criteria, the control may automatically decide when the current pressing process is to be ended. An additional interaction by a user regarding the end of the pressing process is not required. If the control has detected that one switch-off criterion or more switch-off criteria have been reached, the rotation direction of the electric motor is reversed from the operating rotation direction to the opposite loosening rotation direction, which ends the pressing process. The switch-off criteria may be flexibly stipulated with the aid of the pressing parameters. With different pressing tools, different materials to be pressed or changing empirical values, this makes a flexible adjustment of the switching off possible.

The problems mentioned above are also solved by a method of operating a pressing tool, comprising the following steps:

Operating a hydraulic force transmitting unit by an electric motor rotating in an operating rotation direction;

Detecting the end of the pressing process by a control of the pressing tool;

Reversing the rotation direction of the electric motor from the operating rotation direction to the loosening rotation direction after the detection of the end of the pressing process; and Opening a pressure relief valve of the hydraulic force transmitting unit by the electric motor rotating in the loosening rotation direction.

The detection of the end of the pressing process by the control makes it possible that the pressing tool only applies the pressing force required for the workpiece in order to achieve optimal pressing. A pressing process which reaches the maximum pressing force of the pressing tool, does not have to be performed. Thus, the wear of the pipe pressing tool and the additional pressing duration associated with this are also eliminated.

After the control has detected the end of the pressing process, it initiates the reversal of the motor rotation direction from the operating rotation direction to the loosening rotation direction in order to open the pressure relief valve of the hydraulic force transmitting unit by the electric motor rotating in the loosening rotation direction and to return the pressing instrument into its open initial position. By means of the present method, a simple, fast and optimal pressing of the workpiece to be pressed is ensured, wherein the maximum pressing force of the pressing tool does not have to be applied in most cases because of the early detection of the end of the pressing process, which results in longer maintenance intervals, less wear of the pressing tool, shorter pressing durations and a longer battery life.

The method is preferably used for plastically deforming a tubular workpiece, for example a compression fitting of a heating or sanitary installation.

Preferably, the hydraulic force transmitting unit and the pressing jaws of the pressing tool are returned to their final position due to the opening of the pressure relief valve.

Preferably, the method further comprises the step of detecting the final position of the force transmitting unit and switching off the electric motor by the control.

This further simplifies the control and handling of the pressing tool for the user. Manually switching off the electric motor is eliminated. The automatic switch-off saves electricity and provides the user with direct feedback about the end of the return process of the pressing tool into the open state, particularly in unclear areas of application.

Preferably, the end of the pressing process is detected by one or more of the following switch-off criteria being reached:

Increase in the supply current or reaching of a predefined supply current of the electric motor;

Increase in the pressing force or reaching of a predefined maximum pressing force;

Increase in the torque or reaching of a predefined torque;

Reaching a maximum number of revolutions of the electric motor;

Increase in the hydraulic pressure or reaching a predefined maximum hydraulic pressure;

An increase in the supply current, pressing force, torque and hydraulic pressure may be determined and calculated by means of the sensors and control electronics and be used as a switch-off criterion. In this way, the pressing tool may determine a switch-off time specific to the material and the instrument during the pressing process in order to switch off the pressing tool without the maximum pressing force of the pressing tool being applied. Still, optimal pressing of the workpiece is achieved. A manual determination and/or input of maximum values for a switch-off by the user, based on material and/or instrument parameters, thus, may be omitted. Irrespective of this, however, predefining maximum parameters of the supply current, pressing force, torque, hydraulic pressure and/or a maximum number of revolutions of the electric motor of the pressing tool is also possible.

Preferably, the method further comprises the step that the pressure relief valve of the hydraulic force transmitting unit closes again after having reached its final position. In this way, another pressing process may be started immediately after a pressing process has ended.

Below, preferred embodiments of the present invention are described in detail with reference to the enclosed figures.

FIG. 1 shows the drive and control portion of a preferably hand-held pressing tool 1 as used for joining together pipes by means of compression fittings, for example. The hand-held pressing tool 1 comprises an electric motor 2 which is a DC electric motor in one embodiment. The electric motor 2 is driven with electricity from a battery and/or an accumulator or by a wired power supply or a combination thereof (not shown). The output side of the electric motor 2 is connected to a transmission 4 in order to reduce its torque to a speed that is suitable for the pick-up, a piston pump 20 in this case. The electric motor 2 and the transmission 4 may also be designed as one cohesive electric motor transmission unit. Furthermore, instead of an electric motor with a transmission, an electric motor that already has the corresponding speed and/or the corresponding torque may be used.

On the output side of the transmission 4, an eccentric shaft 6 is connected to the output shaft of the transmission 4. The eccentric shaft 6 is mounted in a rotatable manner on ball bearings 7. The eccentric shaft 6 comprises an eccentric 6a which linearly moves a piston 22 of the piston pump 20 up and down. To reduce friction, the eccentric 6a is surrounded by a ball bearing 6b which applies the eccentric force to the piston 22. The ball bearing 6b prevents the surface of the eccentric from gliding on the surface of the piston and, thus, minimizes friction.

The piston 22 of the piston pump 20 is preloaded towards the eccentric 6a with the aid of a spring 21. If the eccentric 6a is rotated due to a revolution of the eccentric shaft 6, the piston 22 is pressed against the spring 21. This causes a non-return valve 24 at the piston pump 20 to open, and a hydraulic fluid 44 is pumped from a liquids reservoir 40 into a cylinder space 14a above the servo piston 12 of the hydraulic force transmitting unit 10 via a conduit 23 and a conduit 26 by means of the piston pump 20.

If the eccentric shaft 6 is rotated further, the eccentric 6a is rotated away from the piston 22 of the piston pump 20 again, so that the piston 22 moves in the direction of the eccentric shaft 6 due to the restoring force of the spring 22. In this process, non-return valve 24 of the piston pump 20 closes and prevents a return flow of hydraulic fluid 44 from the cylinder space 14a.

When the eccentric shaft 6 is continuously rotated in the operating rotation direction RA (see FIG. 2a), the piston pump 20 pumps hydraulic fluid 44 into the cylinder space 14a, which increases the pressure there and causes the servo piston 12a to be shifted towards the instrument side 16 of the pressing tool 1 and/or to the left in FIG. 1. The head 12a of the servo piston 12 which may be axially moved in the cylinder 14 may comprise a seal 13, preferably a sealing ring.

On the instrument side 16 of the pressing tool 1, a pressing instrument (not shown) may be attached which is actuated by the servo piston 12. Due to the force of the servo piston 12 during its movement in the direction of the instrument side 16, the pressing jaws of the tool (not shown) close to compress a workpiece. The pressing jaws then generate a pressing force F which is directly proportional to hydraulic pressure P (F=P×A (A=area of the servo piston)). When the pressing jaws are closed around a workpiece or a compression fitting, an opposite force is generated and the hydraulic pressure increases in the cylinder space 14a. Due to the increasing hydraulic pressure and the resulting force between the pressing jaws, the workpiece and/or the compression fitting is plastically deformed.

The pressing process is controlled by an electronic control 60 which analyses the signals of at least one sensor 52-60. Sensors 52-60 measure process parameters and the control 60 is adapted to detect the end of the pressing process based on at least one process parameter.

In one embodiment, a pressure sensor 52 at the hydraulic force transmitting unit 10 may determine the hydraulic pressure in the cylinder space 14a of the cylinder 14 (pressure side) during a pressing process and convey its measurement data to the control 50. The pressure sensor 52 may be embodied as an analog or digital pressure sensor 52. In an analog pressure sensor 52, an A/D converter may additionally be provided which converts the measured analog signals into digital signals.

Furthermore, a torque sensor 54 may be provided which measures a torque in force transmitting unit 10. For this purpose, a strain gauge might be arranged at eccentric shaft 6, for example.

Furthermore, a revolution sensor 56 may be provided which captures the revolutions of the electric motor 2. The revolution sensor 56 may preferably be a hall effect sensor or an optical sensor for capturing the revolutions of the electric motor 2.

Equally, a current sensor 60 may be provided which captures the supply current of the electric motor 2. The current sensor 60 may preferably be integrated into the control 50.

Furthermore, a force sensor 58 may be provided which captures a mechanical force characteristic of the pressing force. For this purpose, a load cell might preferably be integrated into the piston 12.

The sensors 52-60 may be used individually or in various combinations and all supply their measurement values to the control 50 which analyzes the measurement values in order to specifically determine, on their basis, whether the end of the pressing process has been reached. For this purpose, the control may use one or more of the following switch-off criteria:

- the increase of the supply current or reaching of a predefined supply current of the electric motor 2, particularly measured by the current sensor 60;
- the increase of the pressing force or reaching of a predefined maximum pressing force, particularly measured by the force sensor 58;
- the increase of the torque or reaching a predefined maximum torque, particularly measured by the torque sensor 54;
- the reaching of a maximum number of revolutions of the electric motor, particularly measured by the revolution sensor 56;
- the increase of the hydraulic pressure or reaching a predefined maximum hydraulic pressure, particularly measured by the pressure sensor 52.

Depending on the analysis results, the control 50 then controls the electric motor 2. The latter may specifically be idle, rotate in the operating rotation direction RA in order to operate the piston pump 20, or rotate in the loosening rotation direction RL in order to open a pressure relief valve 30 in a motor driven manner. When the pressure relief valve 30 is opened, the hydraulic pressure in the cylinder space 14a is relieved and the hydraulic fluid may flow back into the reservoir 40 from the cylinder space via the conduit 42. In this process, the piston 12 returns to its initial position in which the jaws of the pressing instrument (not shown) are opened.

In FIGS. 1, 2a and 2b, a preferred embodiment of a pressure relief valve 30 is shown. The pressure relief valve 30 is controlled via a cam 34 which is arranged on the eccentric shaft 6 via a coupling 33. The coupling 33 preferably is a cam clutch which transmits the rotary motion of the eccentric shaft 6 to the cam 34 when the electric motor 2 rotates in the loosening rotation direction RL, but does not transmit force and does not drive the cam 34 when the electric motor 2 and the eccentric shaft 6 rotate in an opposite rotation direction RA. Preferably, the coupling 33 is embodied as a ball bearing with a freewheel. However, the freewheel and seating of the cam may also be realized as separate components. The coupling 33 may also be designed as an overload slipping clutch or the like which then acts as a freewheel in combination with the cam 34 and the following mechanical system as a whole.

In the illustrated embodiment, the cam 34 actuates a lever 32 when rotated in the loosening rotation direction RL by moving its head 32a away and, thus, pivoting the lever 32 as illustrated in FIG. 2b. FIG. 2b shows the pressure relief valve 30 in its open position actuated by the cam 34 and the lever 32 in loosening rotation direction RL of the eccentric shaft 6. FIG. 2a shows the pressure relief valve 30 in its closed position in operating rotation direction RA of the eccentric shaft 6.

The lever 32 is further connected to a valve shutter 38 of the pressure relief valve 30 in a movable manner at a connecting point 32b. The valve shutter 38 controls an outflow of hydraulic fluid 44 to the reservoir 40 from the cylinder space 14a via the conduits 42 and 26. The valve shutter 38 is preloaded into its closed position by means of a spring 39. Here, the lever 32 is pressed against a stopper 36 by the force of the spring 39. Overall, the lever 32 may pivot about a pivotal point 32c to the end opposite to its lever head 32a. At pivotal point 32c, the lever is mounted to the hydraulic force transmitting unit 10 in a pivotal manner.

When the electric motor 2 is controlled in the loosening rotation direction RL by the control 50 when the pressing process is ended, as illustrated in FIG. 2b, the cam 34 hits the head 32a of the lever 32 in its rotary motion. Depending on the initial position of the cam 34, this happens after a maximum of one revolution of the eccentric shaft 6. When the eccentric shaft 6 and, thus, the cam 34 are further rotated in the loosening rotation direction RL, the cam 34 moves the lever 32 in a direction opposite to its preload, to the right in FIG. 2b, which causes the lever 32 to shift the valve shutter 38 to its open position and, thus, the pressure relief valve 30 to be opened in a motor-driven manner. In this way, the hydraulic fluid 44 that is under pressure may flow back into the reservoir 40 from the cylinder space 14a.

In case that opening the pressure relief valve 30 once is not sufficient for returning the servo piston 12 to its initial position, more hydraulic fluid 44 may flow into the reservoir 40 from the cylinder space 14a due to further revolutions of the electric motor 2 and the eccentric shaft 6 in the loosening rotation direction. By a suitable control of the electric motor 2 by the control 50, the eccentric shaft 6 may also be stopped in a position in which the pressure relief valve 30 is opened. In this way, returning the servo piston 12 faster and an additional saving of time and power are achieved.

Reaching the initial position of the servo piston 12 and/or relieving the hydraulic pressure in the first region 14a of the cylinder space 14 may be measured by means of the pressure sensor 52 and be forwarded to the control 50. In reaction to this, the control 50 may cause the electric motor 2 to be completely stopped. Then, the pressing tool 1 is in its open initial state again and may immediately be used for another pressing process.

In particular when soft workpieces such as copper or plastic fittings are pressed, ending the pressing process before a maximum pressing force of the pressing tool 1 is reached is advantageous. Still, a relief valve may be provided in order to protect the pressing tool 1 from unintended excess pressure, e.g. in case of a maximum pressure in the range of 170 bar. The pressure relief valve 30 may also be configured in such a manner that it also acts as a normal relief valve in addition to the opening in a motor-driven manner. For this purpose, the force of the spring 39 specifically is to be selected according to the desired opening pressure.

LIST OF REFERENCE NUMBERS

1 Pressing tool
2 Electric motor
4 Transmission
6 Eccentric shaft
6a Eccentric
6b Ball bearing
7 Seating
10 Hydraulic force transmitting unit
12 Servo piston
12a Head of the servo piston
13 Seal
14 Cylinder
14a Cylinder space
16 Instrument side
20 Piston pump
21 Spring
22 Piston
23 Conduit
24 Valve shutter
26 Conduit
30 Pressure relief valve
32 Lever
32a Lever head
32b Connecting point
32c Pivotal point
33 Coupling, freewheel ball bearing
34 Cam
36 Stopper
38 Valve shutter
39 Spring
40 Reservoir
42 Conduit
44 Hydraulic fluid
50 Control
52 Pressure sensor
RA Operating rotation direction
RL Loosening rotation direction Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A pressing tool for plastically deforming a workpiece, comprising:
   an electric motor;
   pressing jaws for applying a pressing force to a workpiece;
   a hydraulic force transmitting unit for transmitting a force of the electric motor to the pressing jaws, comprising a piston pump driven by the electric motor rotating in operating rotation direction RA, and a pressure relief valve;
   a coupling arrangement which mechanically couples the electric motor to the pressure relief valve, so that the electric motor opens the pressure relief valve when operated in a loosening rotation direction RL opposite to the operating rotation direction RA; and wherein the pressure relief valve includes a spring biasing the pressure relief valve in a closed position.

2. The pressing tool according to claim 1, further comprising the coupling which only acts in loosening rotation direction RL of the electric motor.

3. The pressing tool according to claim 2, wherein the coupling comprises a freewheel.

4. The pressing tool according to claim 3 wherein the freewheel comprises a freewheel ball bearing.

5. The pressing tool according to claim 2, further comprising a cam driven by the electric motor via the coupling, wherein the cam may open the pressure relief valve.

6. The pressing tool according to claim 5, further comprising a lever of the pressure relief valve upon which the cam may act.

7. The pressing tool according to claim 1, further comprising an eccentric shaft driven by the electric motor with an eccentric for actuating the piston pump.

8. The pressing tool according to claim 7, further comprising a cam driven by the electric motor via the coupling, wherein the cam may open the pressure relief valve, wherein the cam is mounted on the eccentric shaft via the coupling and is driven by the eccentric shaft in loosening rotation direction RL.

9. The pressing tool according to claim 1, further comprising a control for controlling the electric motor and at least one sensor for measuring at least one pressing parameter, wherein the control is adapted to detect an end of a pressing process based on the at least one pressing parameter and to operate the electric motor in the loosening rotation direction RL opposite to the operating rotation direction RA in order to open the pressure relief valve.

10. The pressing tool according to claim 9, wherein the control detects the end of the pressing process when switch-off criteria are met, wherein the control then reverses the rotation direction of the electric motor from the operating rotation direction RA to the loosening rotation direction RL.

11. The pressing tool according to claim 9, wherein the at least one sensor comprises at least one sensor selected from a group consisting of a sensor which captures the revolutions of the electric motor, a current sensor which captures the supply current of the electric motor, a pressure sensor which captures the hydraulic oil pressure, a force sensor which captures a mechanical force characteristic of the pressing force, a torque sensor which captures a torque in the force transmitting unit, and combinations thereof.

12. The pressing tool according to claim 1, wherein the force of the spring is selected upon a desired opening pressure of the pressure relief valve.

13. A method of operating a pressing tool, wherein the method comprises the following steps:
providing a pressure relief valve and a spring biasing the pressure relief valve in a closed position;
operating a hydraulic force transmitting unit by an electric motor rotating in an operating rotation direction RA;
detecting an end of a pressing process by a control of the pressing tool; reversing a rotation direction of the electric motor from the operating rotation direction RA to a loosening rotation direction RL after the detection of an end of a pressing process; and
opening a pressure relief valve of the hydraulic force transmitting unit by the electric motor rotating in the loosening rotation direction RL.

14. The method according to claim 13, wherein a servo piston of the hydraulic force transmitting unit and pressing jaws of pressing tool return to their final positions due to the opening of the pressure relief valve.

15. The method according to claim 13, further comprising a step of detecting a final position of pressing tool and of switching off the electric motor by the control.

16. The method according to claim 13, wherein the end of the pressing process is detected by the reaching of one or more of the following switch-off criteria:
increase of a supply current or reaching a predefined supply current of the electric motor;
increase of a pressing force or reaching a predefined maximum pressing force;
increase of a torque or reaching a predefined torque;
reaching a maximum number of revolutions of the electric motor;
increase of a hydraulic pressure or reaching a predefined maximum hydraulic pressure.

17. The method according to claim 13, wherein the pressure relief valve of the hydraulic force transmitting unit closes again after the force transmitting unit has reached its final position.

* * * * *